(12) United States Patent
Holsinger

(10) Patent No.: US 6,245,275 B1
(45) Date of Patent: Jun. 12, 2001

(54) METHOD FOR FABRICATING COMPOSITE STRUCTURES

(75) Inventor: Terrell R. Holsinger, Hurst, TX (US)

(73) Assignee: Vought Aircraft Industries, Inc., Dallas, TX (US)

( * ) Notice: Subject to any disclaimer, the term of this patent is extended or adjusted under 35 U.S.C. 154(b) by 0 days.

(21) Appl. No.: 09/311,616

(22) Filed: May 13, 1999

(51) Int. Cl.$^7$ .................................................. B29C 70/44
(52) U.S. Cl. .................. 264/257; 264/258; 264/313; 264/316; 264/334; 425/389; 425/440; 425/442; 425/DIG. 44; 249/127
(58) Field of Search ................................. 264/257, 258, 264/334, 510, 511, 313, 116; 425/403, 440, 389, 390, DIG. 44, 442; 249/127, 128

(56) References Cited

U.S. PATENT DOCUMENTS

| | | | |
|---|---|---|---|
| 3,643,911 | * 2/1972 | Reid | 249/170 |
| 4,463,046 | 7/1984 | Hutchison et al. | 428/156 |
| 4,981,738 | 1/1991 | Farnworth et al. | 428/55 |
| 5,022,845 | * 6/1991 | Charlson et al. | 425/403 |
| 5,073,428 | 12/1991 | Lancelot et al. | 428/67 |
| 5,350,614 | 9/1994 | Chase et al. | 428/53 |
| 5,463,794 | 11/1995 | Erland | 16/225 |
| 5,492,466 | * 2/1996 | Frailey | 425/389 |
| 5,501,832 | * 3/1996 | Adams | 264/510 |
| 5,547,629 | * 8/1996 | Diesen et al. | 264/257 |
| 5,593,633 | * 1/1997 | Dull et al. | 264/510 |

FOREIGN PATENT DOCUMENTS

2106827 * 4/1983 (GB) .

OTHER PUBLICATIONS

Stephen W. Rice, Carroll Grant, "Design and Manufacturing Concepts for Damage Tolerant Nacelle Structure," 28th International Sampe Technical Conference, Seattle, Washington, Nov. 4–7, 1996.

* cited by examiner

Primary Examiner—Jan H. Silbaugh
Assistant Examiner—Stefan Staicovici
(74) Attorney, Agent, or Firm—Baker Botts L.L.P.

(57) ABSTRACT

A method for fabricating composite structures is provided that includes providing a skin (20) that has at least one layer (160) of uncured composite material, and providing a flexible hinge tool (100) that has first and second tooling portions (110, 120) coupled with a flexible hinge (140). The first and second tooling portions (110, 120) of the hinge tool (100) each have a molding surface (112, 122), and the tooling portions (110, 120) are configured to form at least a portion of a stiffening member (10). The method further includes laying up at least one layer (160) of uncured composite material on the molding surfaces (112, 122) to form the stiffening member (10). The flexible hinge tool (100) is positioned on the skin (20) such that the uncured composite material laid up on the first tooling portion (110) of the hinge tool (100) contacts the skin (20), and such that the uncured composite material on the second tooling portion (120) extends from the skin (20) to form an upstanding segment (14) of the stiffening member (10). The skin (20) and the uncured composite material on the flexible hinge tool (100) are simultaneously cured to form a stiffened composite structure. The flexible hinge tool (100) is removed by bending the tool (100) at the flexible hinge (140) such that the first portion (110) of the tool (100) peels away from the skin (20), and such that the second portion (120) of the tool (100) peels away from the upstanding segment (14) of the stiffening member (10).

8 Claims, 4 Drawing Sheets

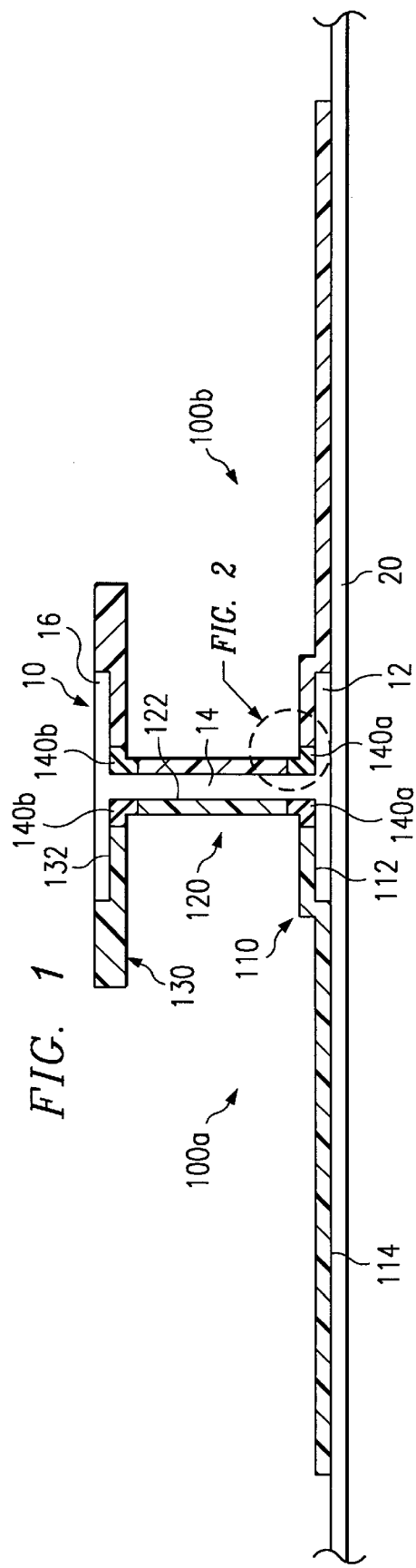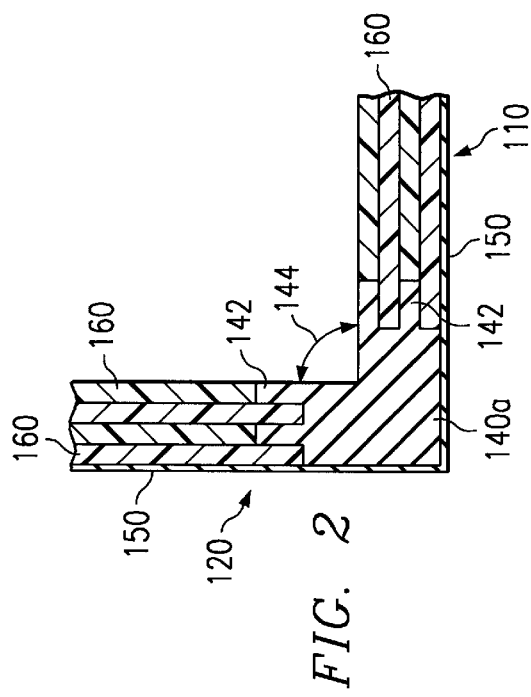

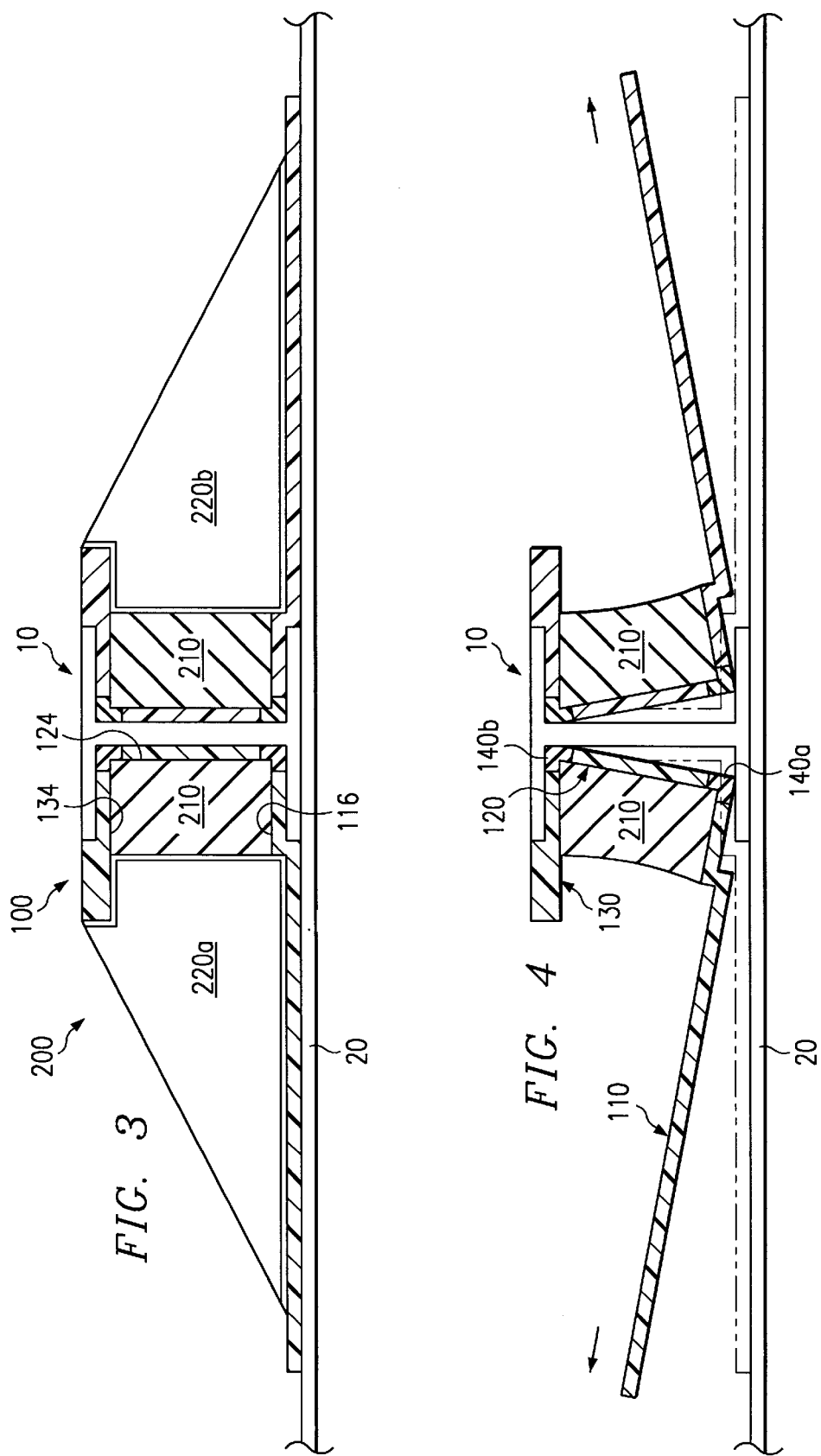

METHOD FOR FABRICATING COMPOSITE STRUCTURES

BACKGROUND OF THE INVENTION

Many applications today call for the fabrication of components from "composite" materials, also known as fiber-reinforced plastics. Fiber-reinforced plastics are comprised of reinforcing fibers that are positioned in a polymer matrix. Commonly, the reinforcing fibers are fiberglass, although high strength fibers such as aramid and carbon are used in advanced applications, such as aerospace applications. The polymer matrix is a thermoset resin, typically polyester, vinyl ester, or epoxy. Specialized resins, such as, phenolic, polyurethane and silicone are used for specific applications.

Composite materials may be formed using numerous fabrication process. One such process that is common in the aerospace industry is a lay up process. In a typically lay up process, layers of reinforcing fiber are laid in a mold by hand or by a placement machine. Liquid resin is then poured on the fiber materials such that the resin fills the spaces between the fibers. The materials may then be cured at room temperature or in an autoclave and the liquid resin turns into a solid thermoset. The fibers are thus impregnated in the solid thermoset resin and reinforce the resin. Alternatively, layers of fibers can be pre-impregnated with resin and then partially cured to form layers of "prepreg" material. After this partial curing, the resin has not completely set, and the prepreg layers are flexible and can be shaped in or around a mold or forming tool. Once the prepreg layers are so shaped, the prepreg is then completely cured in an autoclave to form a fiber-reinforced laminate.

Composite structures often have several discrete composite components. For example, composite aircraft structure includes a composite skin, a number of stiffening members and other support structures. In metal aircraft wings, the various parts are formed separately and then fastened together using fastening methods such as welding and riveting. However, due to the nature of composite components, such fastening methods are not useful. Instead, the composite components are typically formed together using methods such as lay ups and autoclave curing, described above.

Due to the nature of forming tools that are traditionally used, these components are typically fabricated in a sequential fashion. For example, in the fabrication of a composite wing, the skin is first molded and cured. One set of stiffening members is then formed on the wing skin, and the entire structure is cured again. Further stiffening members and other structural supports are then sequentially added to the structure and cured. This method of fabrication is extremely expensive and time-consuming, and greatly increases the costs of advanced composite structures such as aircraft components.

Therefore, a need has arisen for a new method and apparatus for fabricating composite structures that overcomes the disadvantages and deficiencies of the prior art.

SUMMARY OF THE INVENTION

A method for fabricating composite structures is disclosed. The method includes providing a skin that includes one or more layers of uncured composite material, and providing a flexible hinge tool that has first and second tooling portions coupled with a flexible hinge. The first and second tooling portions of the hinge tool each have a molding surface, and the tooling portions are configured to form at least a portion of a stiffening member. The method further includes laying up at least one layer of uncured composite material on the molding surfaces to form the stiffening member.

Furthermore, the flexible hinge tool is positioned on the skin such that the uncured composite material laid up on the first tooling portion of the hinge tool contacts the skin, and such that the uncured composite material on the second tooling portion extends from the skin to form an upstanding segment of the stiffening member. The skin and the uncured composite material on the flexible hinge tool are simultaneously cured to form a stiffened composite structure. The method also includes the step of removing the flexible hinge tool by bending the tool at the flexible hinge such that the first portion of the tool peels away from the skin, and such that the second portion of the tool peels away from the upstanding segment of the stiffening member.

In another embodiment, an apparatus for fabricating composite structures is provided. The apparatus includes first and second tooling portions that are configured to support at least one layer of composite material during curing to form a composite structure. The apparatus further includes a flexible hinge that is disposed between and couples the first and second tooling portions. The flexible hinge couples the tooling portions such that they may be peeled away from the layers of composite material after curing by bending the apparatus at the flexible hinge.

A technical advantage of the present invention is that a method for fabricating composite parts is provided. Another technical advantage is that this method allows most, if not all, of the components of a stiffened composite skin to be fabricated using a single curing process, thus reducing time and expense. A further technical advantage is that the present invention allows stiffening members to be positioned closely together on a composite structure. The above advantages are due, in part, to the ability of flexible hinge tools incorporating teachings of the present invention to be easily removed from between closely spaced components. Another technical advantage is the ability of such flexible hinge tools to have numerous configurations for tooling various stiffening members and other composite parts.

Other technical advantages are readily apparent to one skilled in the art from the following figures, descriptions, and claims.

BRIEF DESCRIPTION OF THE DRAWINGS

For a more complete understanding of the present invention, the objects and advantages thereof, reference is now made to the following descriptions taken in connection with the accompanying drawings in which:

FIG. 1 is a elevation view of an apparatus for fabricating composite structures comprising a pair of flexible hinge tools incorporating teachings of the present invention;

FIG. 2 shows an elevation view with portions broken away of a flexible hinge of the flexible hinge tool of FIG. 1;

FIG. 3 illustrates a tooling assembly using the flexible hinge tool of FIG. 1 to fabricate a composite structure according to the teachings of the present invention;

FIG. 4 shows the removal of the flexible hinge tool of FIG. 1 from the fabricated composite structure of FIG. 3;

DETAILED DESCRIPTION OF THE INVENTION

Figure 5:
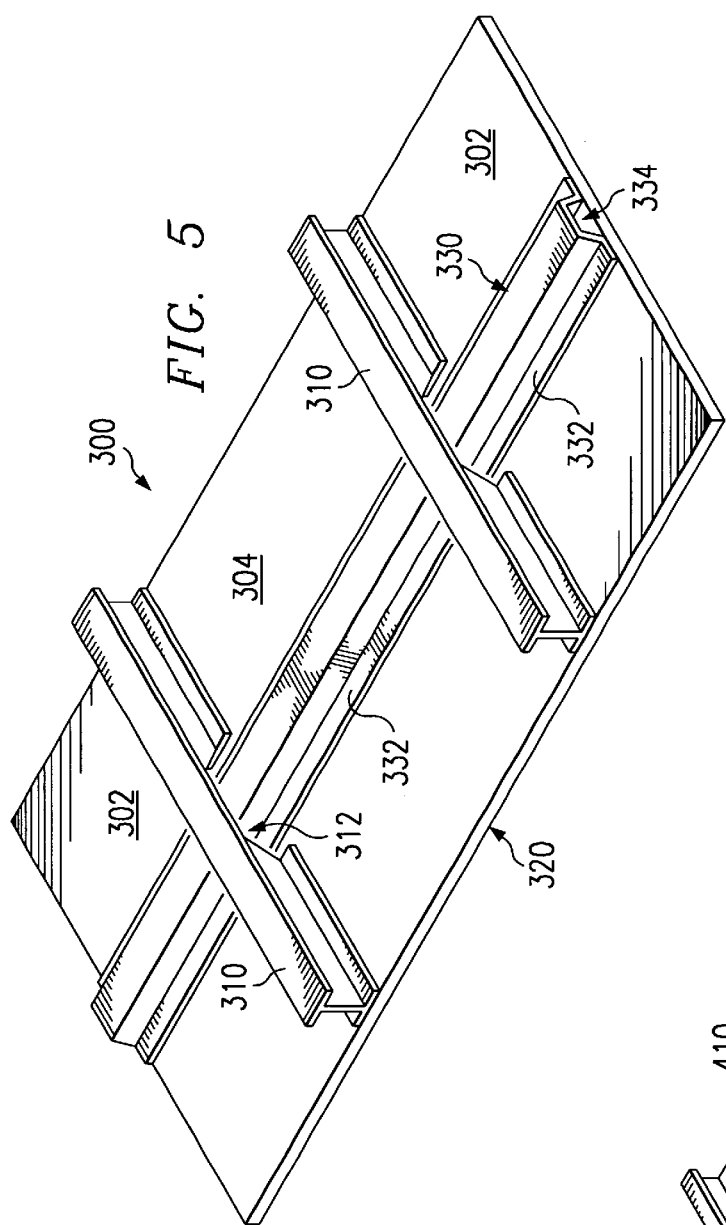
FIG. 5 is an isometric view of another composite structure fabricated using teachings of the present invention.

The preferred embodiment of the present invention and its advantages are best understood by referring to FIGS. 1 through 7 of the drawings, like numerals being used for like and corresponding parts of the various drawings.

FIG. 1 is an elevation view of an apparatus for fabricating composite structures comprising a pair of flexible hinge tools 100 incorporating teachings of the present invention. Flexible hinge tools 100 are shown as configured to fabricate a composite stiffening member on a composite skin 20. In the illustrated embodiment, the stiffening member is an I-beam 10. However, it will be understood from the following description, that flexible hinge tools incorporating teachings of the present invention can be configured to form numerous parts having varying geometries. For example, flexible hinge tools 100 could easily be converted to form T-beams, J-beams or blades. The number and/or shape of tooling portions, described below, would simply be changed to form these alternative configurations.

Each flexible hinge tool 100 is configured to form one half of I-beam 10. Each hinge tool 100 includes a first tooling portion 110 that has a molding surface 112 on which a bottom segment 12 of I-beam 10 is formed. Each hinge tool 100 further includes a vertical tooling portion 120, including a molding surface 122 on which a vertical segment 14 of I-beam 10 is formed. Finally, each hinge tool 100 includes a top tooling portion 130 that has a molding surface 132 on which a top segment 16 of I-beam 10 is formed. Bottom tooling portion 110 is connected to vertical tooling portion 120 by a flexible hinge 140a. Likewise vertical tooling portion 120 is coupled to top tooling portion 130 by a flexible hinge 140b.

It should be noted that vertical tooling portion 120 is a specific type of "upstanding" tooling portion. Stiffening members generally have an upstanding segment that extends away from the skin to stiffen the skin. Such an upstanding segment does not have to extend normally from the skin, as with vertical segment 14 of I-beam 10. Rather, the upstanding segment can be any portion of a stiffening member that extends from the skin to stiffen the skin.

I-beam 10 is formed by positioning or "laying up" layers of uncured composite material over molding surfaces 112, 122, 132 and flexible hinges 140 of each hinge tool 100. By layers of uncured composite material, it is meant the uncured or partially cured layers of material that are necessary to form a fiber-reinforced plastic material. Fiber-reinforced plastics are comprised of reinforcing fibers positioned in a polymer matrix. Commonly, the reinforcing fiber is fiberglass, although high strength fibers such as aramid and carbon are used in advanced applications, such as aerospace applications. The polymer matrix is a thermoset resin, typically polyester, vinyl ester, or epoxy. Specialized resins, such as, phenolic, polyurethane and silicone are used for specific applications.

In a typically lay up process, layers of woven reinforcing fiber are laid in a mold. Liquid resin is then poured on the fiber mat such that the resin fills the spaces between the fibers. The materials are then cured at room temperature or in an autoclave and the liquid resin turns into a solid material. The fibers are thus impregnated in the solid thermoset resin and reinforce the resin. Alternatively, layers of fibers can be pre-impregnated with resin and then partially cured to form layers of "prepreg" material. After this partial curing, the resin has not completely set, and the prepreg layers are flexible and can be shaped in or around a mold. Once the prepreg layers are so shaped, the prepreg is then completely cured in an autoclave to form a fiber-reinforced laminate. Such prepreg layers are preferably used in conjunction with the present invention, and are included in the term "uncured composite material."

The layers of uncured composite material laid up on each hinge tool 100 form one half of I-beam 10. In order to form a composite structure comprising I-beam 10 and skin 20, hinge tool 100a is first placed on skin 20. Skin 20 may include cured or uncured layers of composite material similar to those layers laid up on hinge tools 100. Hinge tool 100a is positioned on skin 20 such that the layers of composite material laid up on molding surface 112 contact the layers of composite material that comprise skin 20. Likewise, hinge tool 100b is positioned on skin 20 such that the layers and composite material on molding surface 112 contact skin 20. In addition, hinge tool 100b is positioned on skin 20 such that the layers of material on molding surface 122 of flexible hinge tool 100b contact the layers of material on molding surface 122 of hinge tool 100a.

When hinge tools 100 are so positioned, the layers of material on molding surfaces 112 comprise bottom segment 12 of I-beam 10, the layers of material on molding surfaces 122 comprise vertical segment 14 of I-beam 10, and the layers of material on molding surfaces 132 comprise top segment 16 of I-beam 10. The layers of material over flexible hinges 140a and 140b of hinge tools 100 also partially contribute to forming these segments of I-beam 10. It should be noted that although the materials that comprise I-beam 10 are now positioned in place on skin 20, these materials are still uncured and unbonded to each other or to skin 20. The process of curing and bonding I-beam 10 and skin 20, and the process of removing flexible hinge tools 100a and 100b are discussed below in conjunction with FIG. 3.

FIG. 2 shows a broken away elevation view of flexible hinge 140a of flexible hinge tool 100b of FIG. 1. Although only hinge 140a and the connection of bottom tooling portion 110 to vertical tooling portion 120 is discussed, the characteristics of flexible hinge 140a and tooling portions 110 and 120 described below apply equally to flexible hinge 140b and top tooling portion 130. In the illustrated embodiment, bottom tooling portion 110 and vertical tooling portion 120 are comprised of layers 160 of cured composite material. Preferably-such layers are cured prepreg layers, the same or similar material from which I-beam 10 is preferably formed. Alternatively, tooling portions 110 and 120 may be comprised of a metallic substance, such as steel. However, hinge tool 100 is typically fabricated from a fiber reinforced plastic material by using composite layers 160, as shown, when the thermal expansion coefficient of hinge tool 100 is required to be the same or substantially the same as the thermal expansion coefficient of the composite, fiber-reinforced plastic components that hinge tool 100 is used to fabricate.

As described above, flexible hinge 140a couples bottom tooling portion 110 to vertical tooling portion 120. Flexible hinge 140a is preferably comprised of an unreinforced thermoset elastomer, such as MOSITES Rubber Product #10276, that is capable of returning to its original position after hinge tool 100 is bent by increasing or decreasing the angle 144 between tooling portions 110 and 120. In the illustrated embodiment, flexible hinge 140a includes a set of tabs 142 that extend in a direction parallel to layers 160 of tooling portions 110 and 120. Tabs 142 are interleaved or interlocked with alternating layers 160 of tooling portions 110 and 120. In order to accomplish such interleaving, alternating layers 160 are offset to accommodate tabs 142 where they extend from flexible hinge 140a.

If tooling portions 110 and 120 are formed from prepreg layers 160 or other composite materials, flexible hinge 140a may be co-cured with the uncured composite material in order to bond flexible hinge 140a to tooling portions 110 and 120. Alternatively, layers 160 may be cured to form a fiber reinforced plastic laminate, and then flexible hinge 140 may be bonded to the laminate using an appropriate bonding method. If tooling portions 110 and 120 are comprised of a single layer of metallic material, the metallic material may be machined such that tabs 142 of flexible hinge 140a may be interleaved with the metallic material. Flexible hinge 140a may be bonded to such a metallic material using a single or multiple component primer/adhesive or other appropriate metal/rubber (elastomeric) bonding method.

Hinge tool 100 may also include a rubber or gel-coat layer overlay 150 applied over the molding surfaces of tooling portions 110, 120 and flexible hinge 140a. Such overlay 150 provides a barrier between tooling portions 110 and 120 and the layers of composite material of I-beam 10 being formed. This rubber overlay 150 aids in the removal of hinge tool 100 from I-beam 10 after curing.

FIG. 3 illustrates a tooling assembly 200 incorporating flexible hinge tools 100a and 100b of FIG. 1. Tooling assembly 200 is used in the curing process of I-beam 10 and skin 20. Tooling assembly 200 includes a pressure insert 210. Pressure insert 210 is typically a two component, high temperature resistant silicon rubber, however, other suitable materials may be used. Pressure insert 210 is used to maintain outward pressure on tooling portions 110, 120 and 130 of hinge tools 100, and is used to maintain the I shape of I-beam 10 during curing. Although not illustrated in FIG. 1, pressure insert 210 may be formed as an integral component of each flexible hinge tool 100. In such a case, pressure insert 210 may be molded and then positioned against and bonded with inner surfaces 116, 124 and 134 of flexible hinge tools 100. Alternatively, pressure insert 210 may be cast into place using tooling portions 110, 120 and 130 as a mold.

Tooling assembly 200 further includes a pair of wedges 220a and 220b. Wedges 220 are configured to be inserted against pressure insert 210 and between tooling portions 110 and 130. Furthermore, wedges 220 are configured to provide a flat and smooth surface from the top of tooling portion 130 to skin 20. Such a configuration aids in the bagging of I-beam 10, skin 20 and hinge tools 100, described below. Wedges 220 may be comprised of a two-component, high-temperature resistant epoxy, or any other suitable material.

Once tooling assembly 200 is in place, the uncured composite layers of I-beam 10 and skin 20 are cured using an autoclave process. Before curing, I-beam 10, hinge tools 100, and skin 20 are covered by a vacuum bag (not explicitly shown). A vacuum is then drawn from the bag such that an inner surface of the bag contacts tooling assembly 200. Due to the use of wedges 220, the end of top tooling portion 130 of hinge tools 100 is prevented from puncturing the bag. The components in the bag are then placed in the autoclave and cured at a high temperature and pressure. This curing process causes the various layers of uncured composite material to form a fiber-reinforced plastic laminate. In addition, I-beam 10 is bonded to skin 20 during the curing process. This curing process is well known in the art and will not be discussed in further detail.

FIG. 4 shows the removal of flexible hinge tools 100 after I-beam 10 and skin 20 have been cured and bonded together. The first step in the removal of hinge tools 100 is to lift bottom tooling portion 110 and peel it back from skin 20. It should be noted that although the term "peel" is used, any manner of non-destructively removing tooling portions may be used in conjunction with the present invention. As bottom tooling portion 110 is lifted, flexible hinge tool 100 bends at flexible hinge 140a such that bottom portion 110 may be lifted without disturbing vertical tooling portion 120 or top tooling portion 130. Without the presence of flexible hinge 140a, great pressure would be placed on the junction between bottom tooling portion 110 and vertical tooling portion 120 when lifting bottom tooling portion 110. In addition, excessive force may be placed on I-beam 10. Therefore, without the use of flexible hinge 140a, damage to the tool and/or I-beam 10 may result from the removal of hinge tool 100.

The second step in removing hinge tools 100 is to pull bottom tooling portion 110 away from I-beam 10 such that vertical tooling portion 120 peels away from vertical segment 14 of I-beam 10. As vertical tooling portion 120 is pulled away from I-beam 10, flexible hinge tool 100 bends at flexible hinge 140b. This hinging action allows top tooling portion 130 to be peeled away from top segment 16 of I-beam 10. Again, the bending of flexible hinge tools 100 allowed by flexible hinge 140b allows flexible hinge tools 100 to be removed from I-beam 10 without excessive forces being applied to flexible hinge tools 100 or I-beam 10. In addition to reducing the stresses applied to flexible hinge tools 100 and I-beam 10, flexible hinges 140a and 140b allow flexible hinge tool 100 to be removed from tight positions between multiple stiffening or crossing members that are simultaneously cured on skin 20. An example of such a configuration is described below.

FIG. 5 is an isometric view of a composite structure 300 fabricated using flexible hinge tools incorporating teachings of the present invention. Composite structure 300 is a stiffened composite skin representing a typical configuration used in the fabrication of airplane wings. Structure 300 includes a composite skin 320 having a pair of I-beams 310 providing stiffening support, and a hat crossing member 330 positioned generally normal to I-beams 310, and coupled to skin 320 under I-beams 310 to provide additional support to skin 320. It should be noted that hat crossing member 330 also serves to stiffen skin 320, and thus hat 330 is also a stiffening member. For the purposes of this application, "crossing member" will be used in a general manner to reference any additional structure that is used in conjunction with a stiffening member to support or stiffen a part, such as a skin, but that runs in a direction non-parallel to the stiffening member such that it crosses the stiffening member.

The traditional fabrication of composite structure 300 typically includes a triple-curing process. In such a process, the first step is to lay up the uncured layers of composite material comprising skin 320 on a mold. A caul plate is place over the layers to provide pressure to the layers, and the skin is then bagged and cured on the mold in an autoclave.

Next, layers of uncured material are shaped on a rigid forming member to form hat member 330. An elastomeric bladder, having a shape corresponding to the open section 334 of hat 330 is then placed on skin 320 where hat 330 is to be positioned. The forming member is then inverted and placed over the bladder such that the bladder contacts the uncured composite material forming hat 330. A caul plate is then placed over hat 330, and the assembly is bagged and cured. This second curing step cures hat 330, and bonds hat 330 to skin 320. It should be noted that it is also known to combine the two previous curing steps. In this modified process, hat 330 is formed on skin 320 as described above, except that the layers comprising skin 320 have not yet been cured. A caul plate is then placed over skin 320 and hat 330, and skin 320 and hat 330 are cured together.

The third curing step in the conventional process (or the second curing step in the modified process) involves shaping uncured layers of composite material over I-beam tools to form I-beams 310. These conventional I-beam tools are typically made of metal, such as steel or aluminum, and have the shape of one-half of an I-beam (split down the vertical webbing). I-beam tools, and thus I-beams, have a cutaway section 312 such that I-beam tools may be placed over hat 330 in contact with skin 320. The I-beam tools and their associated uncured layers of composite material are positioned on skin 320 over hat 330, and then skin 320, hat 330 and I-beams 310 are bagged and cured in an autoclave. This third curing step bonds I-beams 310 to skin 320.

The present invention provides a method of fabricating composite structure 300 using a single curing step. Such a one-step curing process is possible due to the fact that flexible hinge tools incorporating teachings of the present invention may be used simultaneously as a caul plate for skin 20, and forming tools for I-beams 310 and hat 330. Such a tool is described below.

Figure 6:
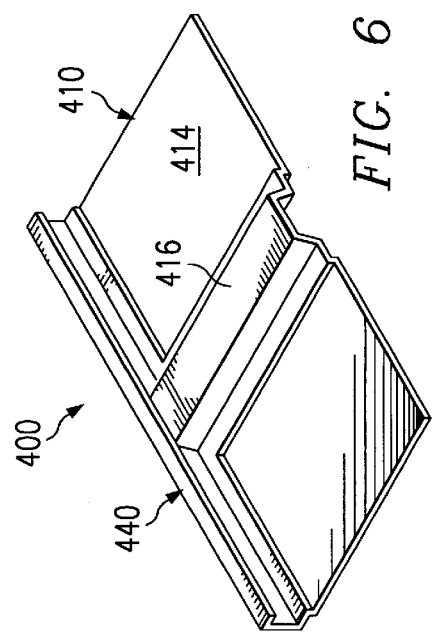
FIG. 6 shows an isometric view of a flexible hinge tool used to fabricate the composite structure of FIG. 5.

FIG. 6 illustrates a flexible hinge tool 400 incorporating teachings of the present invention that may be used to fabricate a portion of composite structure 300, illustrated in FIG. 5. All of the components of flexible hinge tool 400, except hat contour 416, are identical to the components of flexible hinge tool 100 illustrated in FIG. 1. Unlike bottom tooling portion 110 of flexible hinge tool 100 (which is substantially flat), bottom tooling portion 410 of flexible hinge tool 400 includes hat contour 416 that is configured to conform with hat 330.

Referring now to FIGS. 5 and 6, a method of fabricating composite structure 300 using flexible hinge tools 400 is described. First, as in the conventional method, layers of uncured composite material are laid up on a mold to form skin 320. A bladder (not explicitly shown) is then positioned on skin 320 to support hat 330. Next, layers of uncured composite material are laid up on a hard surface and placed over the bladder to form hat 330. Layers of uncured composite material are then laid up on flexible hinge tool 400 to form I-beams 310, as described in relation to flexible hinge tool 100 of FIG. 1. In order to fabricate composite structure 300, four separate flexible hinge tools 400 are required. Each flexible hinge tool 400 forms one half of an I-beam 310. Therefore, one flexible hinge tool 400 is positioned over each end section 302 of structure 300, and two flexible hinge tools 400 are required to be positioned over center section 304 of composite structure 300. When so positioned, bottom tooling portions 410 of hinge tools 400 cover skin 320.

Each flexible hinge tool 400 is positioned on skin 320 such that it conforms with the layers of uncured composite material laid up on the bladder to form hat 330, and such that I-beams 310 are formed in an appropriate position on skin 320. Bottom tooling portion 410 serves as a caul plate for the uncured layers of composite material that comprise skin 320 and hat 330. Because of the close proximity of I-beams 310, and the size of bottom tooling portions 410, the removal of flexible hinge tools 400 positioned on center section 304 of structure 300 is enabled by the fact that hinge tools 400 include flexible hinges 440. After I-beams 310, skin 320 and hat 330 have been bagged and cured, hinge tools 400 are removed in a manner similar to the removal of hinge tools 100 described in conjunction with FIG. 4.

In order to aid the removal of flexible hinge tools 400 positioned over center section 304, bottom tooling portion 410 of one of the hinge tools 400 may be slightly longer than bottom tooling portion 410 of the other flexible hinge tool 400. With such a configuration, the flexible hinge tool 400 with the lengthened bottom tooling portion 410 may overlap bottom tooling portion 410 of the shorter flexible hinge tool 400. A scarf joint between the tool halves 400 would accomplish this purpose.

The overlapping hinge tool 400 is then first lifted and peeled from skin 320 and I-beam 310. After this lengthened flexible hinge tool 400 has been removed, the other hinge tool 400 positioned over center section 304 may be removed in a similar manner. The removal of flexible hinge tools 400 located over end sections 302 is not complicated by an adjacent hinge tool, and therefore such removal is accomplished as described in conjunction with FIG. 4. In summary, due to the flexible nature of flexible hinge tools incorporating teachings of the present invention, such tools may be used to fabricate multiple stiffening or crossing members positioned on a composite skin in a single curing step. Although the configuration shown includes I-beams and hats, many other stiffening or crossing members may be formed according to the teachings of the present invention. Such other stiffening or crossing members include T-beams, J-beams and blades.

Figure 7:
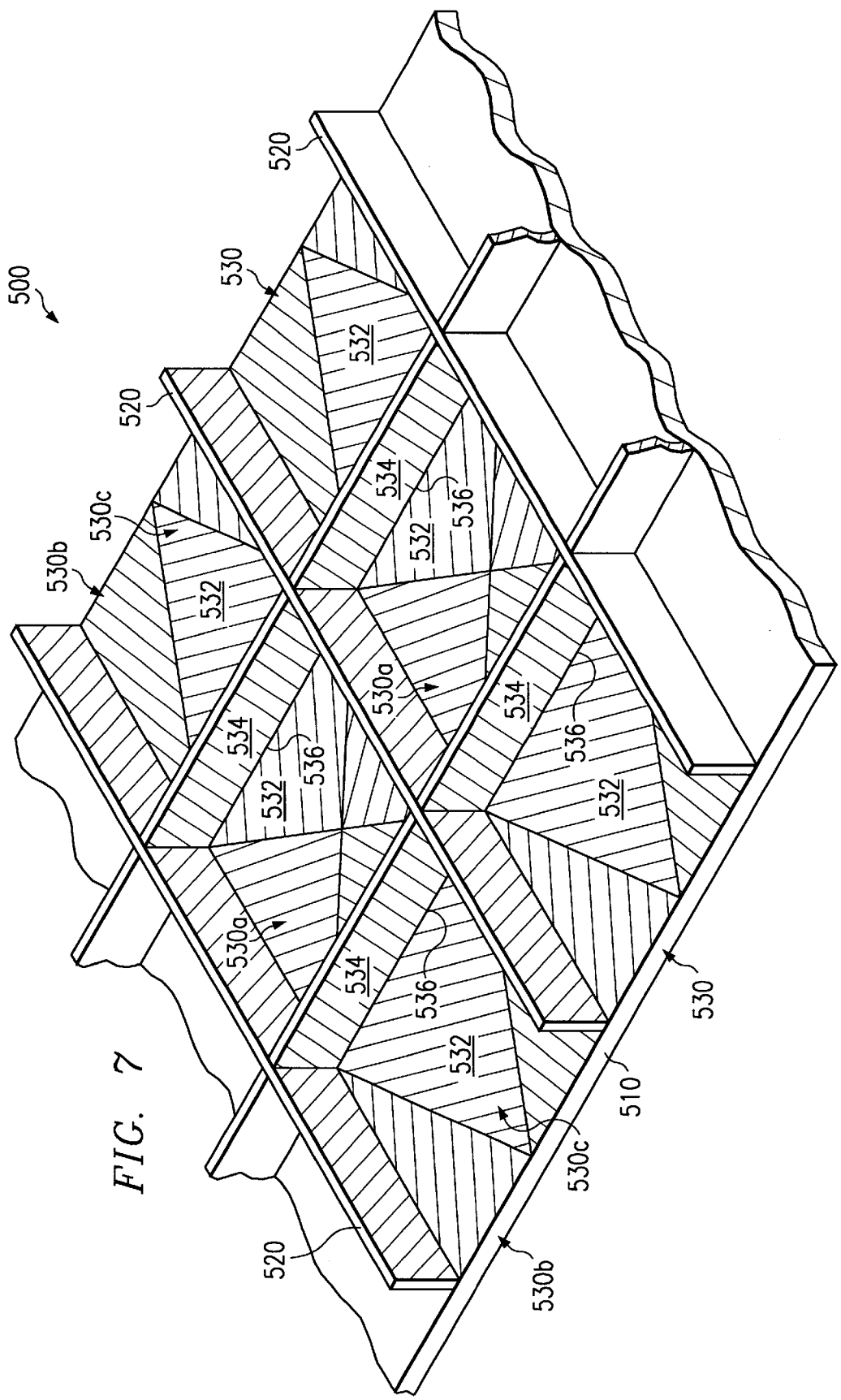
FIG. 7 illustrates an isometric view of yet another composite structure as fabricated using flexible hinge tools incorporating teachings of the present invention.

FIG. 7 illustrates an isometric view of yet another composite structure 500 as fabricated using flexible hinge tools 530 incorporating teachings of the present invention. Structure 500 is typically referred to as an intersecting blade-stiffened structure. Structure 500 is typically used as a support matrix to aid strength to airplane wings. Structure 500 includes a composite skin 510 having a plurality of blades 520, comprised of composite material, used to stiffen skin 510. In the illustrated embodiment, blades 520 are fabricated on skin 510 such that they form a series of "boxes" on the surface of skin 510.

Due to the close proximity of blades 520, the fabrication of blades 520 on skin 510 can be difficult. However, flexible hinge tools 530 incorporating teachings of the present invention may be used to fabricate blades 520 on skin 510 such that structure 500 may be formed and cured in a single step. As with flexible hinge tools 100 of FIGS. 1 through 4, hinge tools 530 include a bottom tooling portion 532 coupled to a vertical tooling portion 534 using a flexible hinge 536. No top tooling portion is required in conjunction with hinge tools 530, since blades 520 do not have a top segment (unlike I-beams). Although the shape and size of tooling portions 532, 534 and hinge 536 differ from the shape and size of tooling portions 110, 120 and hinge 140, these corresponding components operate in a similar manner.

In the illustrated embodiment, the stiffening member is a blade stiffener 520. However, it will be understood from the following description, that flexible hinge tools incorporating teachings of the present invention can be configured to form numerous parts having varying geometries. For example, flexible hinge tools 530 could easily be converted from blades to form I-beams T-beams, J-beams. The number and/or shape of tooling portions, described below, would simply be changed to form these alternative configurations.

In order to fabricate structure 500, three different configurations of flexible hinge tools 530 must be used. First, in order to fabricate "boxes" having four walls of blades 520, hinge tools 530a are used. Four hinge tools 530a are used to fabricate each four-sided box, one tool for each wall. Bottom tooling portions 532 of the four hinge tools 530a together have an area generally equal to the area of skin 510 forming the bottom surface of the box. Hinge tools 530a are further configured such that they may fit together inside the box, as illustrated in FIG. 7. With such a configuration, bottom tooling portion 532 of each tooling member 530a can support its corresponding vertical tooling portion 534, as well as acting as a caul plate for skin 510 during curing.

Vertical tooling portion 534 of each hinge tool 530a is configured to form the desired shape of the blade 520 that comprises the particular wall that the hinge tool 530a is being used to fabricate. As with hinge tool 100, layers of uncured composite material are laid up on vertical tooling portion 534 to form blades 520. It should be noted that each blade 520 forming the walls of the individual "boxes" is fabricated using two hinge tools 530; one hinge tool 530 on each side of the particular blade 520. This fabrication is similar to the fabrication of vertical segment 14 of I-beam 10, illustrated in FIG. 1.

When constructing structure 500, "boxes" are also created bordering the sides of skin 510 that only have three walls. In such cases, hinge tools 530b and 530c are used to fabricate the blades 520 that comprise the three walls. As with hinge tools 530a, bottom tooling portions 532 of hinge tools 530b and 530c are configured such that, when positioned on skin 510 to form a particular box, hinge tools 530b and 530c can be fit together such that the portion of skin 510 forming the bottom surface of the box is completely covered. A particular geometry of bottom tooling portions 532 that can accomplish this task is illustrated in FIG. 7. As with hinge tools 530a, uncured composite material is laid up on vertical tooling portion 534 of hinge tools 530b and 530c to form blades 520. Hinge tools 530b and 530c are then positioned on skin 510 to form the three walls of the "box."

Once all hinge tools 530 have been positioned on skin 510 to form structure 500, the entirety of structure 500 is bagged and cured. As described above, the curing process forms the finished fiber-reinforced plastic material of which skin 510 and blades 520 are comprised. The curing process also bonds blades 520 to skin 510 to complete structure 500. Once the composite materials have been cured, hinge tools 530 must be removed. Traditional unhinged tools would be extremely difficult to remove from the tight spaces between blades 520, and such removal would likely cause damage to the tools and/or structure 500. However, due to the inclusion of flexible hinge 536, hinge tools 530 are relatively easy to remove.

As with hinge tools 100, described above, bottom tooling portion 532 is first lifted and peeled away from skin 510 by bending hinge tools 530 at hinge 536. Once bottom tooling portion 532 is so lifted, vertical tooling portion 534 can than be pulled away from its associated blade 520. In order to assist in the removal of hinge tools 530, bottom portion 532 of one hinge tool 530 in each "box" may slightly overlap the other bottom portions 532 in that box. A scarf joint between tooling portions would accomplish this purpose. The overlapping hinge tool 530 would then be lifted first, allowing room to lift the other hinge tools 530 associated with that box.

While the invention has been particularly shown and described by the foregoing detailed description, it will be understood by those skilled in the art that various other changes in form and detail may be made without departing from the spirit and scope of the invention.

What is claimed is:

1. A method for fabricating composite structures, comprising:
   providing a skin having at least one layer of uncured composite material;
   providing a flexible hinge tool having first and second tooling portions coupled with a flexible hinge, the first and second tooling portions each having a molding surface, and configured to form at least a portion of a stiffening member;
   laying up at least one layer of uncured composite material on the molding surfaces to form the stiffening member;
   positioning the flexible hinge tool on the skin such that the uncured composite material laid up on the first tooling portion of the hinge tool contacts the skin, and such that the uncured composite material on the second tooling portion extends from the skin to form an upstanding segment of the stiffening member;
   curing the skin and the uncured composite material on the flexible hinge tool simultaneously to form a stiffened composite structure; and
   removing the flexible hinge tool by bending the tool at the flexible hinge such that the first portion of the tool peels away from the skin, and such that the second portion of the tool peels away from the upstanding segment of the stiffening member.

2. The method of claim 1, wherein providing the flexible hinge tool comprises providing first and second flexible hinge tools, each tool configured to form one half of an I-beam using a first tooling portion positioned generally parallel to a third tooling portion, and a second tooling portion disposed between and generally normal to the first and third tooling portions.

3. The method of claim 2, wherein positioning the flexible hinge tool on the skin comprises:
   positioning the first flexible hinge tool on the skin such that the layer of material on the first tooling portion contacts the skin, and such that the layer of material on the second tooling portion is generally normal to the skin; and
   positioning the second flexible hinge tool on the skin such that the layer of material on the first tooling portion contacts the skin, and such that the layer of material on the second tooling portion of the second hinge tool is positioned against the layer of material on the second portion of the first hinge tool to form a vertical segment of the I-beam.

4. The method of claim 2, further comprising inserting a wedge between the first, second and third tooling portions of each flexible hinge tool, a surface of each wedge extending from the third tooling portion of each tool to the skin to aid in bagging the flexible hinge tools for curing.

5. The method of claim 2, wherein removing the first and second flexible hinge tools comprises:
   peeling the first tooling portion of each tool away from the skin by bending each tool at a first flexible hinge connecting the first portion and the second portion of each tool; and
   peeling the second portion of each tool away from the vertical segment of the I-beam by bending each tool at a second flexible hinge connecting the second tooling portion and the third tooling portion of each tool.

6. The method of claim 1, further comprising positioning at least one uncured crossing member on the skin prior to positioning the flexible hinge tool on the skin.

7. The method of claim 6, wherein providing the flexible hinge tool comprises providing a hinge tool having a first tooling portion configured to conform with the uncured crossing member disposed on the skin when the first tooling portion is positioned on the skin to form the stiffening member.

8. The method of claim 6, wherein the crossing member is a hat beam.

* * * * *